US009182627B2

(12) United States Patent
Hoshizawa (10) Patent No.: US 9,182,627 B2
(45) Date of Patent: Nov. 10, 2015

(54) LIQUID-DISCHARGING DEVICE WITH OBSERVATION OPTICAL SYSTEM

(75) Inventor: Daisuke Hoshizawa, Nagano (JP)

(73) Assignee: ENGINEERING SYSTEM CO., LTD., Nagano (JP)

( * ) Notice: Subject to any disclaimer, the term of this patent is extended or adjusted under 35 U.S.C. 154(b) by 311 days.

(21) Appl. No.: 14/006,664

(22) PCT Filed: Apr. 11, 2011

(86) PCT No.: PCT/JP2011/002138
§ 371 (c)(1),
(2), (4) Date: Sep. 21, 2013

(87) PCT Pub. No.: WO2012/140689
PCT Pub. Date: Oct. 18, 2012

(65) Prior Publication Data
US 2014/0007810 A1    Jan. 9, 2014

(51) Int. Cl.
| | |
|---|---|
| *G02F 1/1335* | (2006.01) |
| *B05C 5/02* | (2006.01) |
| *G01B 11/14* | (2006.01) |
| *B05B 5/00* | (2006.01) |
| *B05B 12/12* | (2006.01) |

(52) U.S. Cl.
CPC .......... *G02F 1/133516* (2013.01); *B05B 5/007* (2013.01); *B05B 12/122* (2013.01); *B05C 5/0216* (2013.01); *G01B 11/14* (2013.01)

(58) Field of Classification Search
None
See application file for complete search history.

(56) References Cited

U.S. PATENT DOCUMENTS

| | | | | |
|---|---|---|---|---|
| 4,941,428 A | * | 7/1990 | Engel | ......................... B05C 5/02 118/401 |
| 7,059,705 B2 | * | 6/2006 | Iwata | ..................... B41J 29/393 118/712 |
| 7,387,682 B2 | * | 6/2008 | Miura | .................. B41J 2/04526 118/668 |
| 7,823,535 B2 | * | 11/2010 | Hanafusa | .............. B01L 3/0268 118/665 |
| 2003/0132243 A1 | * | 7/2003 | Engel | .................. H05K 13/046 222/61 |
| 2007/0246850 A1 | * | 10/2007 | Schumaker | ........... B29C 43/003 264/40.1 |
| 2009/0108483 A1 | * | 4/2009 | Suehira | .................. B82Y 10/00 264/40.5 |
| 2010/0012838 A1 | * | 1/2010 | Hatakeyama | ...... G01N 23/2251 250/307 |

FOREIGN PATENT DOCUMENTS

| | | |
|---|---|---|
| JP | 2002-323426 A | 11/2002 |
| JP | 2008-170605 A | 7/2008 |
| JP | 2011-029353 A | 2/2011 |

OTHER PUBLICATIONS

International Search Report for PCT/JP2011/002138, Jun. 7, 2011.

* cited by examiner

*Primary Examiner* — Dah-Wei D Yuan
*Assistant Examiner* — Jethro M Pence (57) ABSTRACT

In a liquid discharging device, an objective optical system is moved in the optical axis direction by a focus position adjusting mechanism to perform a first focusing action relative to the tip of a liquid discharging nozzle or a mirror image thereof and a second focusing action relative to the surface of a substrate facing the liquid discharging nozzle, the distance between the nozzle tip and the surface of the substrate is calculated on the basis of the resulting focus positions, and the position of the liquid discharging nozzle is adjusted by nozzle position adjusting mechanism so that the gap is appropriate. According to this configuration, the distance between the nozzle tip and the surface of the substrate can be precisely calculated and an optical unit for observation can be focused on the surface of the substrate.

6 Claims, 5 Drawing Sheets

LIQUID-DISCHARGING DEVICE WITH OBSERVATION OPTICAL SYSTEM

TECHNICAL FIELD

The present invention relates to a liquid-discharging device having a liquid-discharging nozzle for discharging a liquid material onto a surface of a discharge target, and in particular to a liquid-discharging device suitable for accurately discharging a very small amount of a liquid material while observing the discharge in magnification.

BACKGROUND ART

Color filter substrates for liquid crystal panels and semiconductor substrates for integrated circuits, for example, have fine electrode patterns and wiring patterns formed on the surface thereof. A substrate of such description may suffer damage to the pattern during manufacture. A substrate having a damaged location represents a faulty product, and causes a decrease in yield. Therefore, proposals have been made to repair damaged locations to reduce the number of faulty products. Patent Document 1 discloses a defect correction device for performing such repair work.

The defect correction device in Patent Document 1 comprises a stage for placing the substrate, an objective optical system provided so as to face the substrate on the stage, and a discharging nozzle for discharging a repair material. The discharging nozzle is disposed along the optical axis of the objective optical system, and is extended so as to penetrate the center portions of a convex reflecting mirror and a concave reflecting mirror constituting the objective optical system. When a defect of a resist pattern formed on the substrate surface is repaired, the stage on which the substrate is placed is moved horizontally, and the location of repair is positioned directly below the discharging nozzle. It thereby becomes possible to obtain an observation image centered on the location of repair from the objective optical system, making it possible to display the obtained image on the monitor and discharge the repair material while looking at the magnified image of the location of repair.

PRIOR ART DOCUMENTS

Patent Documents

[Patent Document 1] JP-A 2008-170605

SUMMARY OF THE INVENTION

Problems Solved by the Invention

In the configuration in Patent Document 1, the objective optical system and the discharging nozzle are integrated with each other, and no mechanism for moving the objective optical system and the discharging nozzle up and down with respect to the stage is provided. Therefore, if the discharging nozzle is replaced or the thickness of the substrate is changed, the distance (gap) between the nozzle tip and the substrate surface will change. Since the accuracy with which the liquid material is discharged from the discharging nozzle is affected by the gap, there is a risk of the discharge accuracy decreasing due to the variation in the gap. In particular, in a discharging mechanism for discharging a very small amount of liquid, the appropriate value for the gap is considered to be several tens of microns, and accordingly there is a risk of the discharging accuracy decreasing due to even a slight variation in the gap.

In addition, if the position of the substrate surface changes, there is a risk of the focusing on the pattern on the substrate surface being lost, it no longer being possible to obtain a clear observation image, and the workability decreasing.

In addition, in the configuration in Patent Document 1, although the discharging nozzle can be positioned directly above the repair location by horizontally moving the stage on which the substrate is placed, since the objective optical system and the discharging nozzle are integrated with each other, it is not possible to move only the discharging nozzle within the visual field. Therefore, the workability in relation to performing repair work on a plurality of locations or performing repair work on continuously located defect locations while moving the nozzle is not regarded to be satisfactory. In order to make it possible for the discharging nozzle to be moved horizontally relative to the objective optical system in the configuration in Patent Document 1, it is necessary to increase the size of the damage location of the objective optical system, resulting in a darker observation image.

With the foregoing circumstances in view, an object of the present invention is to propose a configuration of a liquid-discharging device comprising a liquid-discharging nozzle and an observation optical system for observing the state of discharge by the liquid-discharging nozzle in magnification, wherein the distance (gap) between the tip of the liquid-discharging nozzle and the discharge target can be accurately detected and adjusted.

Another object of the present invention is to propose a configuration of the liquid-discharging device wherein it is possible to freely move the nozzle to an arbitrary position within the visual field of observation by the observation optical system when discharging a liquid material.

Means to Solve the Problems

In order to solve the above-mentioned problem, a liquid-discharging device with an observation optical system of the present invention is characterized in comprising:

a liquid-discharging mechanism having a nozzle for discharging a liquid material;

an objective optical system for observing, in magnification, a discharge target disposed opposite a tip of the nozzle;

display means for displaying an optical image obtained by the objective optical system;

a focal point position adjustment mechanism for adjusting a focal point position of the objective optical system;

a nozzle position adjustment mechanism for moving, along at least a direction of an optical axis of the objective optical system, the nozzle relative to the objective optical system; and a control unit for controlling the liquid-discharging mechanism, the focal point position adjustment mechanism, and the nozzle position adjustment mechanism;

the control unit performing a first focusing action for aligning the focal point position of the objective optical system to a tip of the nozzle or a mirror image thereof and a second focusing action for aligning the focal point position of the objective optical system to a surface of the discharge target, and calculating the distance between the tip of the nozzle and the surface of the discharge target on the basis of results of implementing the first and second focusing actions.

According to the present invention, the focal point position of the objective optical system can thus be adjusted, making it possible to obtain a clear observation image focused on the discharge target. In addition, since the nozzle can be moved along the direction of the optical axis of the objective optical system, the distance (gap) between the surface of the discharge target and the tip of the nozzle can be adjusted, and in an instance in which the gap has changed, discharging can be performed after an optimum gap state has been reached by adjusting the position of the nozzle.

In particular, in the present invention, the focal point position adjustment mechanism of the objective optical system is used to perform focusing on each of the surface of the discharge target and the tip of the nozzle, and the distance between the surface of the discharge target and the tip of the nozzle is calculated on the basis of the result of implementing the focusing actions (e.g., the focal point positions upon completion of the respective focusing actions, the corresponding positions of different parts of the objective optical system, or the drive amounts of the focal point position adjustment mechanism that can be converted into positions of such description). It is thereby possible to accurately calculate the distance between the surface of the discharge target and the tip of the nozzle, enabling an optimum gap to be accurately produced. Therefore, it is possible to perform the discharging work in an accurate manner while viewing a well-focused observation image.

In such an instance, it is also possible to: perform the first focusing action for aligning the focal point position of the objective optical system onto the mirror image of the tip of the nozzle reflected on a mirror disposed opposite the tip of the discharging nozzle, and the second focusing action, as well as a third focusing action for aligning the focal point position of the objective optical system on a predetermined pattern formed on the surface of the mirror; and calculate the distance between the tip of the nozzle and the surface of the discharge target on the basis of the results of implementing the first, second, and third focusing actions. In an instance in which the position of the tip of the nozzle is to be established on the basis of a mirror image reflected on the mirror, there is a need to establish, in advance, the position of the mirror surface (i.e., the position relative to the surface of the discharge target) or somehow calculate this position. In the present invention, since the third focusing action described above (focusing action performed on a pattern formed on the surface of the mirror) is performed, using the result of implementing the third focusing action and the result of implementing the first focusing action makes it possible to calculate the distance from the tip of the nozzle to the surface of the mirror. Therefore, the distance between the surface of the discharge target and the tip of the nozzle can be calculated, even if the position of the mirror surface is not known.

In an instance in which the nozzle and the objective optical system are coaxially disposed, an observation image centered on the nozzle can be obtained, and the discharge state is more readily observed.

Alternatively, the nozzle position adjustment mechanism is preferably configured so as to be capable of moving the nozzle along an arbitrary direction on a plane orthogonal to the optical axis of the objective optical system. Such an arrangement makes it possible to freely move solely the discharging nozzle within the visual field while keeping the range of the observation visual field fixed. Therefore, it is possible to increase the workability in relation to, e.g., performing discharging on a plurality of locations or performing discharging in a continuous manner while moving the nozzle. In addition, since it becomes possible to retract the discharging nozzle from the visual field, observation of the discharge location (e.g., defect location on the wiring pattern on the substrate) and focusing are facilitated. Also, a configuration in which the horizontal position of the nozzle can be adjusted in a continuous manner or at a very small pitch obviates the need to finely adjust the horizontal position of the discharge target. Accordingly, there is no need to provide a highly accurate position adjustment mechanism on a stage (work platform) for placing the discharge target, and an inexpensive stage can be used. It is thereby possible to reduce the equipment cost for performing highly accurate discharging work.

In the present invention, the liquid-discharging mechanism is preferably configured so as to comprise: voltage application means for applying a pulse voltage on a liquid in a tip opening of the nozzle; and a counter electrode disposed on the rear-surface side of the discharge target, the voltage application means energizing the liquid in the tip opening of the nozzle and generating an electrostatic suction force acting towards the counter electrode, and the electrostatic suction force causing the liquid to be discharged from the tip opening of the nozzle. In an instance in which an electrostatic discharging device is used as the liquid-discharging mechanism as described above, the discharging nozzle portion can be made more compact compared to a conventional ink-jet discharging mechanism. Therefore, the discharging nozzle portion can be housed in the space between the objective lens and the discharge target, even if the space is small.

The present invention may have irradiation means for irradiating the discharge target with at least one of illumination light, measurement light, and process light, the irradiation means being capable of performing irradiation using a light path of the objective optical system. It is thus possible to irradiate the discharge location with illumination light, measurement light, and process light from the objective optical system, and also to perform irradiation with a mixture of the above lights. Therefore, the discharge state can be observed under sufficient brightness, and the workability is increased. It is also possible to perform a process of drying or curing the liquid material or perform focusing using auto-focus light.

Effect of the Invention

According to the present invention, since the focal point position of the objective optical system can be adjusted, it is possible to obtain a clear image focused on the discharge target. In addition, since the nozzle can be moved along the direction of the optical axis of the objective optical system, the distance (gap) between the surface of the discharge target and the tip of the nozzle can be adjusted, and in an instance in which the gap has changed, discharging can be performed after an optimum gap state has been reached by adjusting the position of the nozzle. In particular, since it is possible to accurately calculate the distance between the surface of the discharge target and the tip of the nozzle using the focal point position adjustment mechanism of the objective optical system, an optimum gap can be accurately produced. Therefore, it is possible to perform the discharging work in an accurate manner while viewing a well-focused observation image.

MODE FOR CARRYING OUT THE INVENTION

An embodiment of a liquid-discharging device in which the present invention is applied will now be described with reference to the accompanying drawings.

(Overall Configuration)

Figure 1:
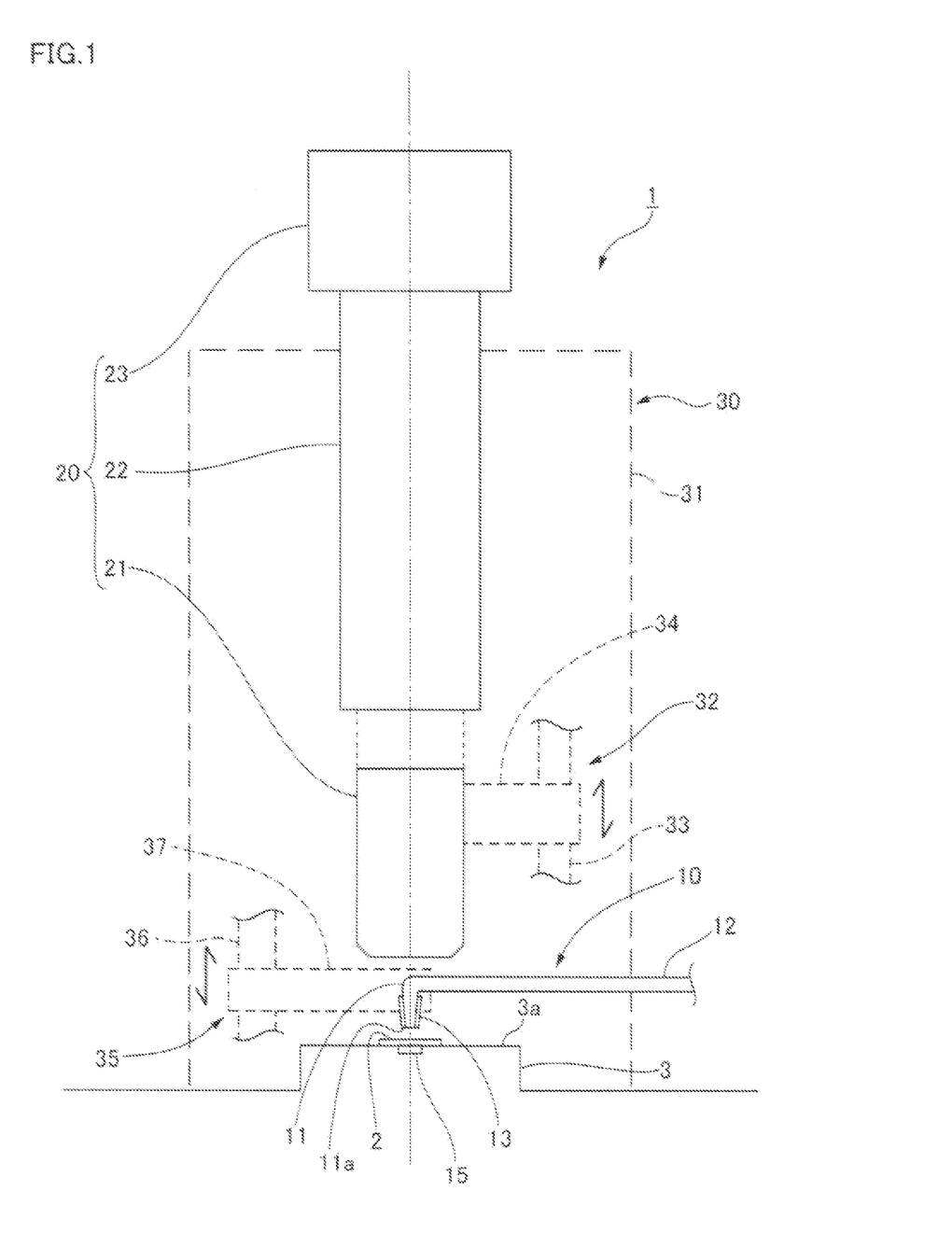
FIG. 1 is a schematic configuration diagram of the principal portion of the liquid-discharging device to which the present invention is applied.

FIG. 1 is a schematic configuration diagram of the principal portion of the liquid-discharging device to which the present invention is applied. The liquid-discharging device 1 is used to repair defects in elements such as a wiring pattern formed on the surface of a substrate 2 (discharge target) such as a color substrate or a semiconductor substrate. The liquid-discharging device 1 comprises: a nozzle unit 10 (liquid discharge mechanism) for discharging a liquid wiring material (liquid material); an observation optical unit 20 arranged on the rear-surface side (side opposite the nozzle discharge direction) of the nozzle unit 10; and a support mechanism 30 for supporting the nozzle unit 10 and the observation optical unit 20. When defect repair work is to be carried out on the substrate 2 using the liquid-discharging device 1, a horizontal work platform 3 for placing the substrate 2 is readied, the support mechanism 30 is arranged so as to be immobile with respect to the work platform 3, a liquid-discharging nozzle 11 of the nozzle unit 10 is made to face the substrate 2 on the work platform 3, and the observation optical unit 20 is disposed thereabove. An arrangement is also possible in which the portion of a placement surface 3a of the work platform 3 is configured as a mobile stage capable of moving horizontally, and the mobile stage is controlled and driven to position the substrate 2 in the horizontal direction. In such an instance, the support mechanism 30 of the liquid-discharging device 1 is provided to the portion of the support platform movably supporting the mobile stage (i.e., the fixed portion of the work platform 3).

The nozzle unit 10 comprises a liquid-discharging nozzle 11 having a very small diameter, and a liquid material feed channel 12 for feeding the liquid material to the liquid-discharging nozzle 11. The liquid-discharging nozzle 11 is disposed so that the center axis A thereof is perpendicular to the placement surface 3a of the work platform 3 and a tip opening 11a is pointing downwards. The liquid material feed channel 12, which extends laterally from the rear end of the liquid-discharging nozzle 11, communicates with a liquid material feed source (not shown). The nozzle unit 10 is also provided with a nozzle-side electrode 13 and a high-voltage amplifier 14 (voltage application means; see FIG. 2) for applying a high-voltage pulse voltage to the liquid-discharging nozzle 11, and a ground electrode 15 (counter electrode) disposed opposite the tip opening 11a of the liquid-discharging nozzle 11. The ground electrode 15 is disposed on the portion of the work platform 3 facing the tip opening 11a.

The observation optical unit 20 comprises an objective optical system 21, an image-forming optical system 22, and a CCD camera unit 23 (display means), disposed so as to be stacked from the bottom to the top. The objective optical system 21 is a unit in which an objective lens is held inside a cylindrical lens barrel, and the image-forming optical system 22 is a unit in which an imaging lens is held inside a cylindrical lens barrel. The objective optical system 21 and the image-forming optical system 22 are disposed so that the optical axis B thereof coincides with the center axis A of the liquid-discharging nozzle 11. Therefore, the liquid-discharging nozzle 11 is positioned at the center of the visual field range of the objective optical system 21.

Light incident on the objective lens from the side of the liquid-discharging nozzle 11 and the work platform 3 passes through the light path in the objective optical system 21 and enters the image-forming optical system 22; then, the imaging lens forms an optical image. When this optical image is inputted into the imaging element row of the CCD camera unit 23, an analog signal from the imaging element row is converted into a digital signal by an A/D conversion circuit in the CCD camera unit 23. The optical image from the objective optical system 21 is thereby converted into image data and displayed on a display screen of the CCD camera unit 23.

The support mechanism 30 comprises a main frame 31 provided to the work platform 3, and the image-forming optical system 22 and the CCD camera unit 23 of the observation optical unit 20 are fixed to the main frame 31. The support mechanism 30 also comprises: a focal point position adjustment mechanism 32 for moving the objective optical system 21 up and down in the direction of the optical axis B thereof and focusing the objective optical system 21; and a nozzle position adjustment mechanism 35 for moving the liquid-discharging nozzle 11 up and down along the direction of the center axis A thereof (i.e., direction coinciding with the optical axis B) and adjusting the position of the liquid-discharging nozzle.

The focal point position adjustment mechanism 32 may comprise, e.g., a guide shaft 33 which extends parallel to the optical axis B and which is supported by the main frame 31, a sub-frame 34 which is slidably mounted on the guide shaft 33 and which holds the objective optical system 21; and a driving mechanism and a driving motor (not shown) for moving the sub-frame 34 along the guide shaft 33. The focal point position adjustment mechanism 32 of such description makes it possible to move the objective optical system 21 up and down relative to the work platform 3 and focus the objective optical system 21.

The connecting part between the objective optical system 21 and the image-forming optical system 22 is configured so as to allow the upward and downward movements of the objective optical system 21 caused by the focal point position adjustment mechanism 32. The configuration is such that light which has passed through the light path in the objective optical system 21 enters the image-forming optical system 22 as a parallel light beam, therefore preventing the optical image obtained from the objective optical system 21 from being affected by the upward and downward movements of the objective optical system 21.

The nozzle position adjustment mechanism 35 is a vertical position adjustment mechanism comprising elements such as: a guide shaft 36 which extends parallel to the center axis A of the liquid-discharging nozzle 11 and which is supported by the main frame 31; a nozzle frame 37 which is slidably mounted on the guide shaft 36 and which holds the liquid-discharging nozzle 11; and a driving mechanism and a driving motor (not shown) for moving the nozzle frame 37 along the guide shaft 36. This mechanism makes it possible to move the liquid-discharging nozzle 11 up and down independently from the objective optical system 21, and adjust the distance D (gap) between the substrate 2 and the tip opening 11a of the liquid-discharging nozzle 11.

(Control System)

Figure 2:
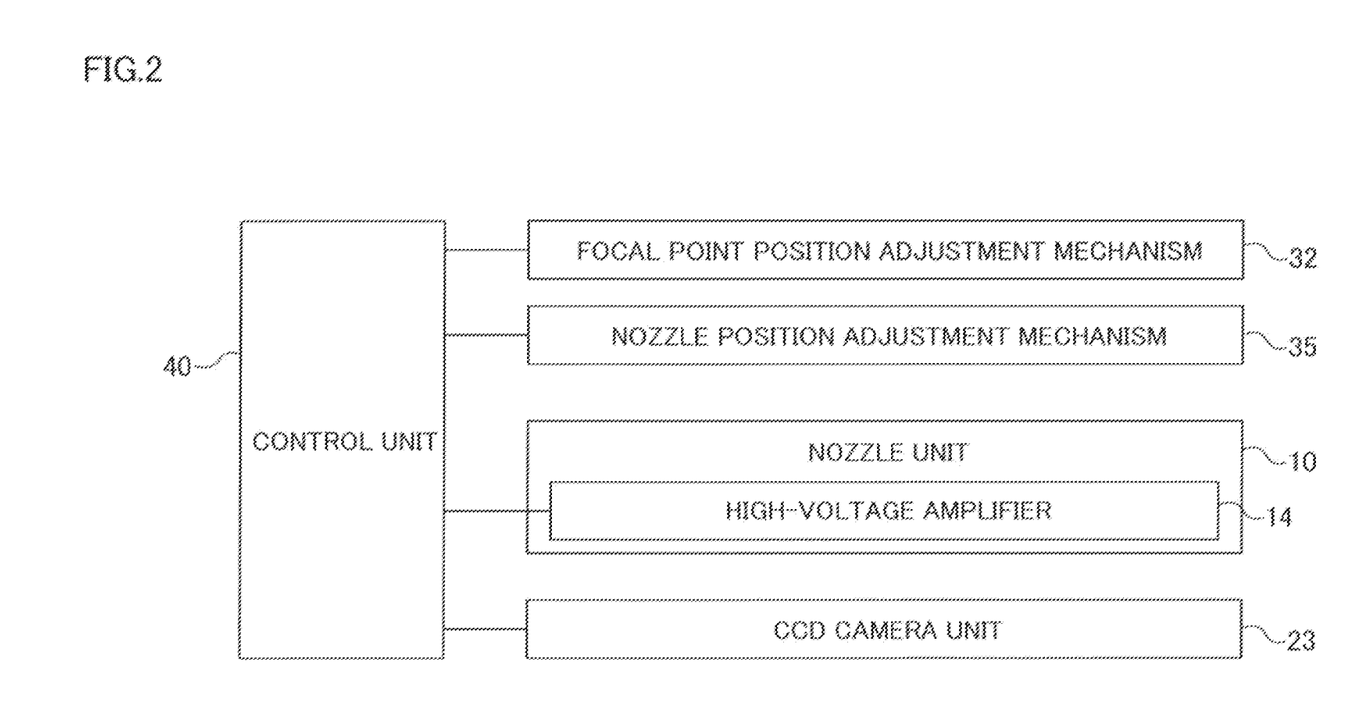
FIG. 2 is a block diagram showing the control system of the liquid-discharging device.

FIG. 2 is a block diagram showing the control system of the liquid-discharging device 1. A control unit 40 for performing overall control of each part of the liquid-discharging device 1 outputs control signals for driving the respective driving motor of the focal point position adjustment mechanism 32 and the nozzle position adjustment mechanism 35, and outputs, to the high-voltage amplifier 14 of the nozzle unit 10, a control signal for generating a pulse voltage, on the basis of commands from a higher-order device or a similar element. The control unit 40 thereby independently adjusts the respective position of the objective optical system 21 and the liquid-discharging nozzle 11, and performs focusing of the objective optical system 21 and positioning (i.e., gap adjustment) of the liquid-discharging nozzle 11. The control unit 40 also energizes the liquid material in the liquid-discharging nozzle 11 using a pulse voltage and generates an electrostatic suction force acting towards the ground electrode 15, and causes the liquid material to be discharged from the tip opening 11a towards the substrate 2.

When performing focusing of the objective optical system 21, the control unit 40 retrieves the optical image of the observed object obtained from the objective optical system 21, i.e., image data captured by the CCD camera unit 23, controls the focal point position adjustment mechanism 32 on the basis of the image data, and performs automatic focusing of the objective optical system 21. For example, the control unit 40 determines the degree of contrast with regards to each part of the image data. Then, the control unit 40 moves the objective optical system 21 along the direction of the optical axis B thereof until the contrast of the target portion (e.g., the wiring pattern on the surface of the substrate 2) is at a maximum, or in other words, until the objective optical system 21 is focused on the target portion, whereby the objective optical system 21 can be focused on the target portion. Alternatively, it is also possible to provide the CCD camera unit 23 with a mechanism for performing irradiation with an auto-focus light, irradiate an observed object such as the substrate 2 with the auto-focus light using the light paths in the image-forming optical system 22 and the objective optical system 21, and perform automatic focusing.

(Measurement of Gap Between Substrate and Tip of Liquid-Discharging Nozzle)

Figure 3:
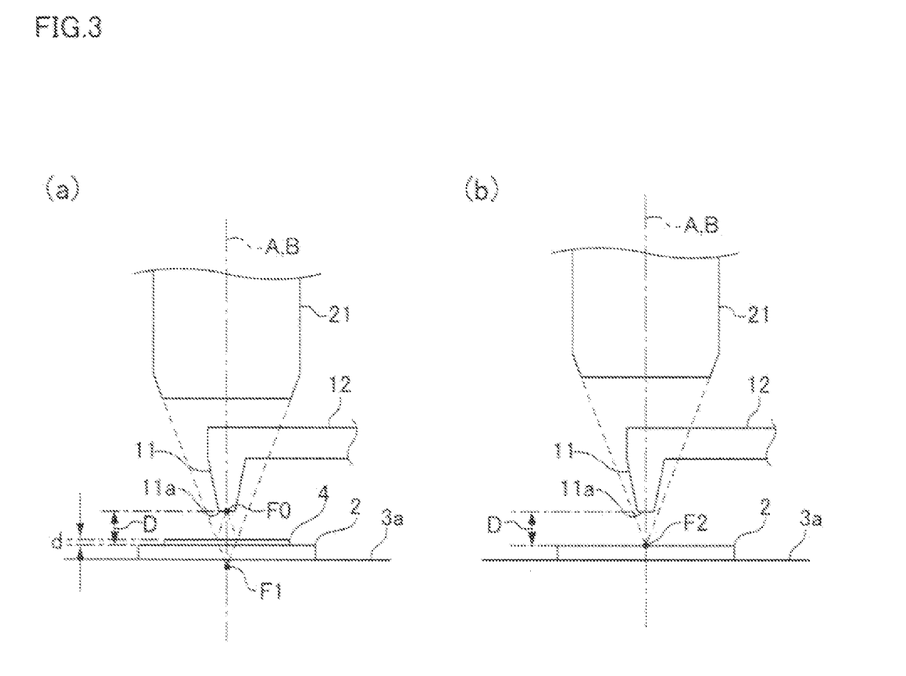
FIG. 3 illustrates a gap measurement method.

When performing an action of discharging the liquid material onto the substrate 2, the control unit 40 of the liquid-discharging device 1 measures the distance D (gap; see FIGS. 3(a) and (b)) between the surface of the substrate 2 and the tip opening 11a of the liquid-discharging nozzle 11. When performing this gap measurement, first, as described above, the liquid-discharging device 1 is placed on the work platform 3, the substrate 2 on the work platform 3 and the liquid-discharging nozzle 11 of the nozzle unit 10 are caused to face each other, and each of the liquid-discharging nozzle 11 and the objective optical system 21 are positioned at an initial position along the direction of the center axis A and the optical axis B thereof. The initial position may be set in advance, or the position used during the previous discharging operation may be used.

FIG. 3 illustrates the gap measurement method. FIG. 3(a) illustrates a first focusing action, and FIG. 3(b) illustrates a second focusing action. In the gap measurement method of the present embodiment, there are performed, without moving the liquid-discharging nozzle 11, a first focusing action for focusing the objective optical system 21 on a mirror image of the tip of the liquid-discharging nozzle 11 and a second focusing action for focusing the objective optical system 21 on the surface of the substrate 2, the respective focal point position when each of the focusing actions is complete is identified on the basis of the initial position of the objective optical system 21 and the degree of adjustment by the focal point position adjustment mechanism 32, and the distance D is calculated on the basis of the focal point positions.

As shown in FIG. 3(a), in the present embodiment, since the liquid-discharging nozzle 11 and the objective optical system 21 are coaxially disposed, the tip of the liquid-discharging nozzle 11 is reflected on a thin mirror 4 placed on the substrate 2, and a focusing action (first focusing action) is performed with respect to the mirror image of the nozzle tip, reflected on the mirror 4. In this instance, the focal point position F1 of the objective optical system 21 when focusing is complete is in a symmetrical positional relationship across the mirror 4 with the actual position F0 of the tip of the liquid-discharging nozzle 11.

Meanwhile, as shown in FIG. 3(b), since the surface of the substrate 2 can be directly observed by the objective optical system 21, a focusing action (second focusing action) is performed with respect to the surface of the substrate 2 without the use of the mirror 4. Therefore, the focal point position F2 of the objective optical system 21 when the focusing action is complete is on the surface of the substrate 2.

The control unit 40 performs the two focusing actions, and calculates the coordinate (along the direction of the optical axis B of the objective optical system 21) of the focal point positions F1, F2 on the basis of the initial position of the objective optical system 21 and the drive amounts of the focal point position adjustment mechanism 32 during the focusing actions. Then, the control unit 40 calculates the distance D (gap) between the surface of the substrate 2 and the tip opening 11a of the liquid-discharging nozzle 11 on the basis of the obtained focal point positions F1, F2 and the pre-measured thickness d of the mirror 4. The distance D may also be calculated on the basis of factors such as the initial position, and the amount of movement due to the focusing action, of each part (e.g., objective lens) of the objective optical system 21, without converting the result of each of the focusing actions into the coordinate values of the focal point positions F1, F2 each time.

$$D = F1 - F2 + 2d \qquad (1)$$

Although in the example shown in FIG. 3(a) the mirror 4 is placed onto the substrate 2 when the focal point position F1 is measured, it is also possible to ready a mirror 4 having the same thickness as the substrate 2 and replace the substrate 2 with a mirror 4 when obtaining the focal point position F1. In such an instance, the distance D can be calculated using the following equation (2).

$$D = F1 - F2 \qquad (2)$$

The control unit 40 can determine, on the basis of the calculated distance D, whether or not there is a need to adjust the position of the liquid-discharging nozzle 11, i.e., whether or not there is a need to adjust the gap between the tip opening 11a and the surface of the substrate 2. For example, the control unit 40 performs a determination through a comparison between the distance D and a reference gap dimension set in advance. If the reference gap dimension and the distance D do not match, the control unit 40 controls, through driving, the nozzle position adjustment mechanism 35, and causes the distance D to match the reference gap dimension. Upon the gap adjustment being complete, the control unit 40 focuses the objective optical system 21 on the surface of the substrate 2 as required, and displays the optical image from the objective optical system 21 on a display screen on the CCD camera unit 23.

As described above, in the present embodiment, when repair work is carried out on a defect location on the wiring pattern of the substrate 2 using the liquid-discharging device 1, the distance D (gap) between the substrate 2 and the tip of the liquid-discharging nozzle 11 can be measured in an accurate manner. Then, the gap can be adjusted on the basis of the measurement result, and the optimum gap dimension state can be accurately produced. The liquid material can thereby be discharged in an accurate manner, and repair work can be carried out at a high degree of accuracy. In a configuration of such description, the variation in the distance D caused by the liquid-discharging nozzle 11 being replaced or the thickness of the substrate 2 being changed can be accurately measured each time and the gap can be adjusted, repair work on a variety of types of substrate 2 can be performed on the spot. In addition, the adjustment work after the replacement of the nozzle is facilitated.

The present embodiment is provided with the focal point position adjustment mechanism 32 of the objective optical system 21, and the gap can be measured using the focal point position adjustment mechanism 32. Therefore, there is no need to provide a dedicated gap measurement mechanism or a similar arrangement. In addition, focusing can be reliably performed on the surface of the substrate 2 using the focal point position adjustment mechanism 32; therefore, the discharge state can be observed using a well-focused, clear image, and conditions such as the state of spreading of the liquid material after discharge can also be established using a clear image. It is thereby possible to perform repair work in a highly accurate manner.

In the present embodiment, the nozzle unit 10 is an electrostatic-type liquid-discharging mechanism. Therefore, small components such as the liquid-discharging nozzle 11 and the nozzle-side electrode 13 are the only mechanisms that must be installed within the visual field range of the objective optical system 21. It thereby becomes possible to house the liquid-discharging mechanism in the small space between the objective optical system 21 and the substrate 2, which would have been considered difficult in the case of an inkjet-type liquid-discharging mechanism, and to reduce the size of the region shielded by the liquid-discharging mechanism in the visual field range of the objective optical system 21.

(Modification)

(1) In the above embodiment, the liquid-discharging nozzle 11 is disposed so as to be coaxial with respect to the objective optical system 21, and the liquid-discharging nozzle 11 is configured so as to be capable of moving only in the direction of the center axis A thereof (i.e., the same direction as that of the optical axis B). However, the nozzle position adjustment mechanism 35 can be such that the liquid-discharging nozzle 11 is capable of moving up and down along the direction of the center axis A and capable of moving in an arbitrary direction in a plane orthogonal to the direction of the center axis A so that the position of the liquid-discharging nozzle can be adjusted in the horizontal direction. In such an instance, a configuration is possible in which, e.g., the nozzle frame 37, which is slidably mounted on the guide shaft 36 in the above embodiment, is provided with an X-axis direction movement mechanism and a Y-axis direction movement mechanism for moving the liquid-discharging nozzle 11 in an arbitrary direction in a plane orthogonal to the center axis A thereof.

This arrangement makes it possible to adjust the position of the liquid-discharging nozzle 11 in a plane orthogonal to the center axis A thereof, making it possible to position the liquid-discharging nozzle 11 directly above an arbitrary position on the substrate 2 without moving the substrate 2. Therefore, the liquid material can be discharged on a plurality of defect locations while keeping the observation range fixed. In addition, since it also becomes possible to discharge the liquid material in a continuous manner while moving the liquid-discharging nozzle 11, it is possible to increase the workability in relation to an instance in which a plurality of defect locations are present or a defect location is formed in a continuous manner. In addition, since the liquid-discharging nozzle 11 can be retracted off the optical axis B, it becomes possible to observe the center portion of the visual field range.

In such an instance, the X-axis direction movement mechanism and the Y-axis direction movement mechanism (horizontal position adjustment mechanism) are preferably configured so as to be capable of performing position adjustment in a continuous manner or at very small pitches. While it is possible, as described further above, to have an arrangement in which the portion of the placement surface 3a of the work platform 3 is a mobile stage capable of moving horizontally, and the mobile stage is controlled through driving to move the substrate 2 and the liquid-discharging nozzle 11 horizontally relative to each other in order to perform positioning, in an instance in which a mechanism for finely adjusting the horizontal position of the liquid-discharging nozzle 11 is provided to the nozzle position adjustment mechanism 35 side, there is no longer a need to perform a fine adjustment of the horizontal position of the substrate 2 on the mobile stage side. Therefore, highly accurate repair work can be carried out even if the mobile stage provided on the side of the work platform 3 has a large adjustment pitch or low adjustment precision. It is thereby possible to use an inexpensive work platform 3 for the repair work, and reduce the equipment cost for performing highly accurate repair work.

(2) The above embodiment was configured so that each of the sub-frame 34 holding the objective optical system 21 and the nozzle frame 37 holding the liquid-discharging nozzle 11 is mounted on the main frame 31 so as to be capable of moving up and down and independently. However, a configuration is also possible in which the liquid-discharging nozzle 11 is mounted with the objective optical system 21 on the sub-frame 34 and integrated as a nozzle unit having a coaxial optical system.

Figure 4:
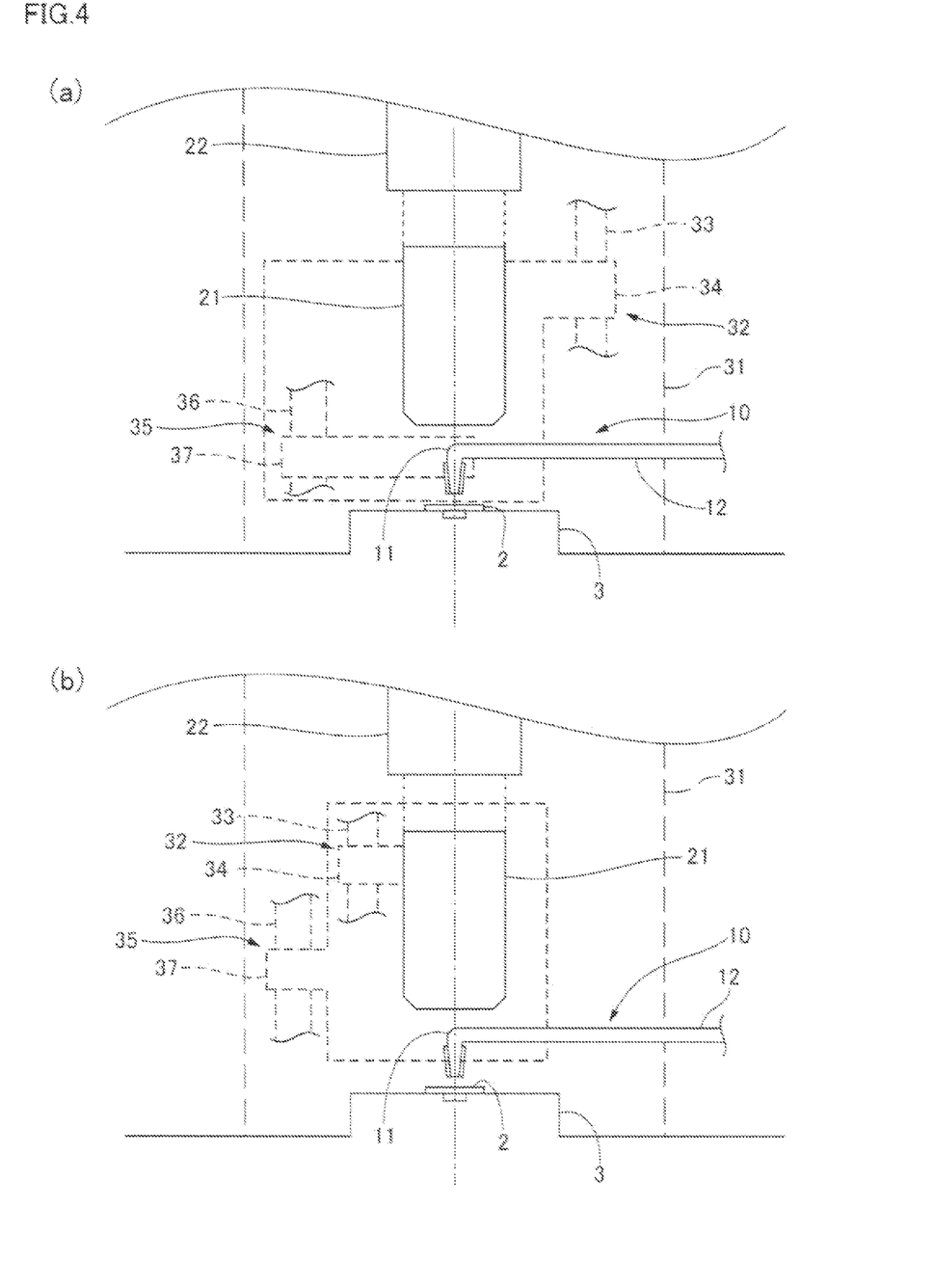
FIG. 4 illustrates a nozzle unit having a coaxial optical system according to a Modification.

FIG. 4 illustrates such a modification of the nozzle unit having a coaxial optical system. As shown in FIG. 4(a), the objective optical system 21 is fixed to the sub-frame 34, and the liquid-discharging nozzle 11 is attached so as to be capable of being moved relative to the sub-frame 34 by a nozzle position adjustment mechanism 35 comprising a guide shaft 36 and a nozzle frame 37, whereby the liquid-discharging nozzle 11 can be moved relative to the objective optical system 21. In such an instance, it is possible to drive the focal point position adjustment mechanism 32 and the nozzle position adjustment mechanism 35 in opposite directions in synchronization and thereby move only the objective optical system 21.

A configuration is also possible in which, as shown in FIG. 4(b), the objective optical system 21 is mounted with the liquid-discharging nozzle 11 to the nozzle frame 37, and attached so as to be capable of being moved relative to the nozzle frame 37 by a focal point position adjustment mechanism 32 comprising a guide shaft 33 and a sub-frame 34. In such an instance, when only the objective optical system 21 is to be moved, only the focal point position adjustment mechanism 32 is driven; and when only the liquid-discharging nozzle 11 is to be moved, the focal point position adjustment mechanism 32 and the nozzle position adjustment mechanism 35 are driven in opposite direction in synchronization.

(3) In the observation optical unit 20 according to the above embodiment, the light path from the objective optical system 21 towards the CCD camera unit 23 can be used as a light path for beaming illumination light towards the object (e.g., substrate 2) observed by the objective optical system 21. For example, a light source and a member for causing light from the light source to enter the light path can be mounted on the CCD camera unit 23, and irradiation with the illumination light can be performed when the image is being captured. Alternatively, a half mirror or a similar element may be provided at a position partway along the light path so that illumination light from another light source enters. Alternatively, process light can also be beamed using this light path. For example, it is possible to irradiate the substrate 2 with infrared light for drying the liquid material, or UV light for causing a UV-curing liquid material to cure. In addition, it is possible to irradiate the substrate 2 with a variety of measurement lights, including the auto-focus light mentioned further above.

(4) It is possible, in the above embodiment, to store a program for automatically analyzing the image captured by the CCD camera unit 23 in the control unit 40, and control elements such as the nozzle unit 10, focal point position adjustment mechanism 32, and nozzle position adjustment mechanism 35 on the basis of the analysis result. For example, it is possible to determine the state of spreading of the discharged liquid material by image analysis, and perform additional discharging if the amount of the liquid material discharged is insufficient. It is also possible to determine, by image analysis, the state in which the liquid material has been cured or dried by the abovementioned process light, and automatically control the irradiation intensity or the irradiation time with respect to the process light on the basis of the determined result.

(5) In the above embodiment, focusing is performed on the mirror image of the liquid-discharging nozzle 11 reflected on the mirror 4. However, if the nozzle tip is shaped so that even a part of the nozzle tip is observable by the objective optical system 21, focusing can be performed directly on the nozzle tip without using the mirror 4. In addition, if the center axis A of the liquid-discharging nozzle 11 is disposed at an angle relative to the optical axis B, it becomes easier to observe the nozzle tip, therefore again making it possible to directly perform focusing without using the mirror 4.

(6) In the above embodiment, there was a need, in order to calculate the distance between the surface of the substrate 2 and the nozzle tip on the basis of the result of focusing performed on the mirror image reflected on the mirror 4, to establish the thickness d of the mirror 4 in advance or ready a mirror 4 having the same thickness as the substrate 2. However, using the following method makes it possible to accurately calculate the distance D (gap) between the nozzle tip and the surface of the substrate 2, even if the thickness of the mirror 4 or of the substrate 2 is unknown.

Figure 5:
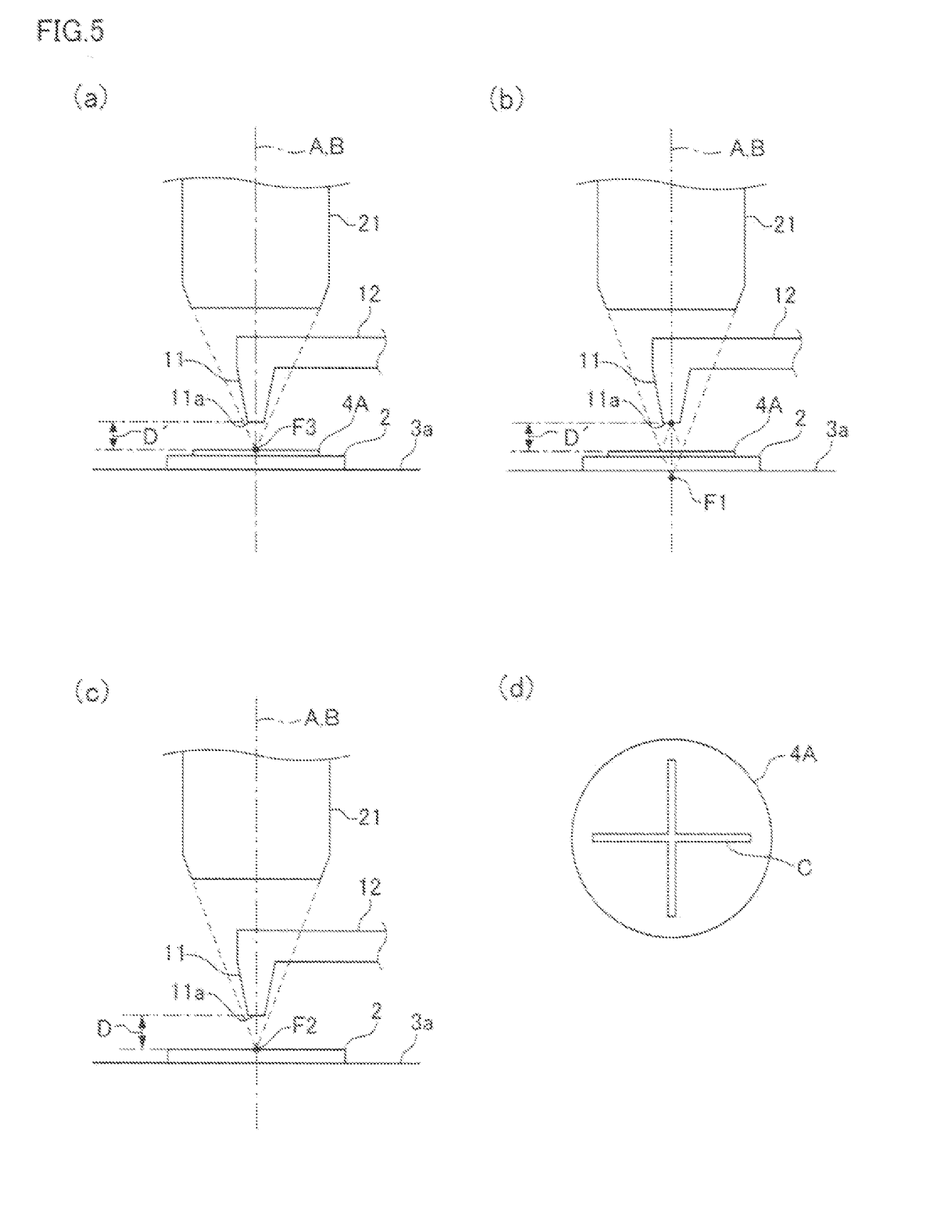
FIG. 5 illustrates a gap measurement method according to the Modification.

FIG. 5 illustrates such a modification of a gap-measuring method. In this method, a patterned mirror 4A having a predetermined pattern C formed on the surface is used. For example, a patterned mirror 4A obtained by forming a vapor deposition film, which represents the mirror surface, on the surface of a plate material and peeling the vapor deposition film only at portions corresponding to the pattern C. FIG. 5(a) illustrates a third focusing action, FIG. 5(b) illustrates a first focusing action, FIG. 5(c) illustrates a second focusing action, and FIG. 5(d) is a plan view of the patterned mirror. The first and second focusing actions shown in FIGS. 5(b) and (c) are performed in a similar manner to those illustrated in FIGS. 3(a) and (b) for the above embodiment, and a description will therefore not be provided. In the third focusing action shown in FIG. 5(a), focusing is performed on the pattern C visible on the surface of the patterned mirror 4A.

The control unit 40 performs the three focusing actions and calculates the coordinate (in the direction of the optical axis B of the objective optical system 21) of the focal point positions F3, F1, F2 on the basis of the initial position of the objective optical system 21 and the drive amounts of the focal point position adjustment mechanism 32 during focusing actions. Then, [the control unit 40] calculates, using the following equation (3), the distance D' (gap) between the surface of the patterned mirror 4A and the tip opening 11a of the liquid-discharging nozzle 11 on the basis of the focal point positions F3 and F1 obtained through the third and first focusing actions.

$$D'=F1-F3 \tag{3}$$

Next, the control unit 40 calculates, using the following equations (4) and (5), the distance D (gap) between the surface of the substrate 2 and the tip opening 11a of the liquid-discharging nozzle 11 on the basis of the obtained distance D' and the focal point position F2 through the second focusing action. Equation (5) is obtained by substituting D' in equation (4) with the right half of equation (3).

$$D=D'+(F2-F3) \tag{4}$$

$$D=F1+F2-2F3 \tag{5}$$

In the example shown in FIGS. 5(a) and (b), the patterned mirror 4A is overlappingly placed on the substrate 2 placed on the work platform 3, and focusing actions for obtaining the focal point positions F1 and F3 are performed in this state. However, it is also possible to employ a technique in which the patterned mirror 4A is directly placed on the work platform 3 without the substrate 2 being placed and the first and third focusing actions are performed, and the patterned mirror 4A is subsequently replaced by the substrate 2 and the second focusing [action] is performed.

Other Embodiments

The above embodiment is one in which the present invention is applied to a liquid-discharging device 1 for discharging a liquid material used for repair work carried out on a wiring pattern or a similar element on the surface of a substrate. However, it shall be apparent that the present invention can be applied to a device having another usage.

The invention claimed is:
1. A liquid-discharging device with an observation optical system comprising:
a liquid-discharging mechanism having a nozzle configured to discharge a liquid material;
an objective optical a system configured to observe, in magnification, a discharge target disposed opposite a tip of the nozzle;
display means for displaying an optical image obtained by the objective optical system;
a focal point position adjustment mechanism configured to adjust a focal point position of the objective optical system;
a nozzle position adjustment mechanism configured to move, along at least a direction of an optical axis of the objective optical system, the nozzle relative to the objective optical system; and
a control unit configured to control the liquid-discharging mechanism, the focal point position adjustment mechanism, and the nozzle position adjustment mechanism;
the control unit programmed to perform a first focusing action aligning focal point position of the objective optical system to the tip of the nozzle or a mirror image thereof and a second focusing action aligning the focal point position of the objective optical system to a surface of the discharge target, and calculating a distance between the tip of the nozzle and the surface of the discharge target on the basis of results of implementing the first and second focusing actions.

2. The liquid-discharging device with the observation optical system according to claim 1, wherein
the control unit performs the first focusing action aligning the focal point position of the objective optical system onto the mirror image of the tip of the nozzle reflected on a mirror disposed opposite the tip of the discharging nozzle, the second focusing action, and a third focusing action for aligning the focal point position of the objective optical system on a predetermined pattern formed on a surface of the mirror; and
the control unit calculates the distance between the tip of the nozzle and the surface of the discharge target on the basis of the results of implementing the first, second, and third focusing actions.

3. The liquid-discharging device having the observation optical system according to claim 1, wherein
the nozzle and the objective optical system are coaxially disposed.

4. The liquid-discharging device having the observation optical system according to claim 1, wherein
the nozzle position adjustment mechanism is configure to move the nozzle along an arbitrary direction on a plane orthogonal to the optical axis of the objective optical system.

5. The liquid-discharging device having the observation optical system according to claim 1, wherein
the liquid-discharging mechanism has voltage application means for applying a pulse voltage on a liquid in a tip opening of the nozzle and a counter electrode disposed on a rear-surface side of the discharge target,
the voltage application means energizes the liquid in the tip opening of the nozzle and generates an electrostatic suction force acting towards the counter electrode, and
the electrostatic suction force causes the liquid to be discharged from the tip opening of the nozzle.

6. The liquid-discharging device having the observation optical system according to claim 1, further comprising:
irradiation means for irradiating the discharge target with at least one of illumination light, measurement light, and process light, the irradiation means performing irradiation using a light path of the objective optical system.

* * * * *